UNITED STATES PATENT OFFICE.

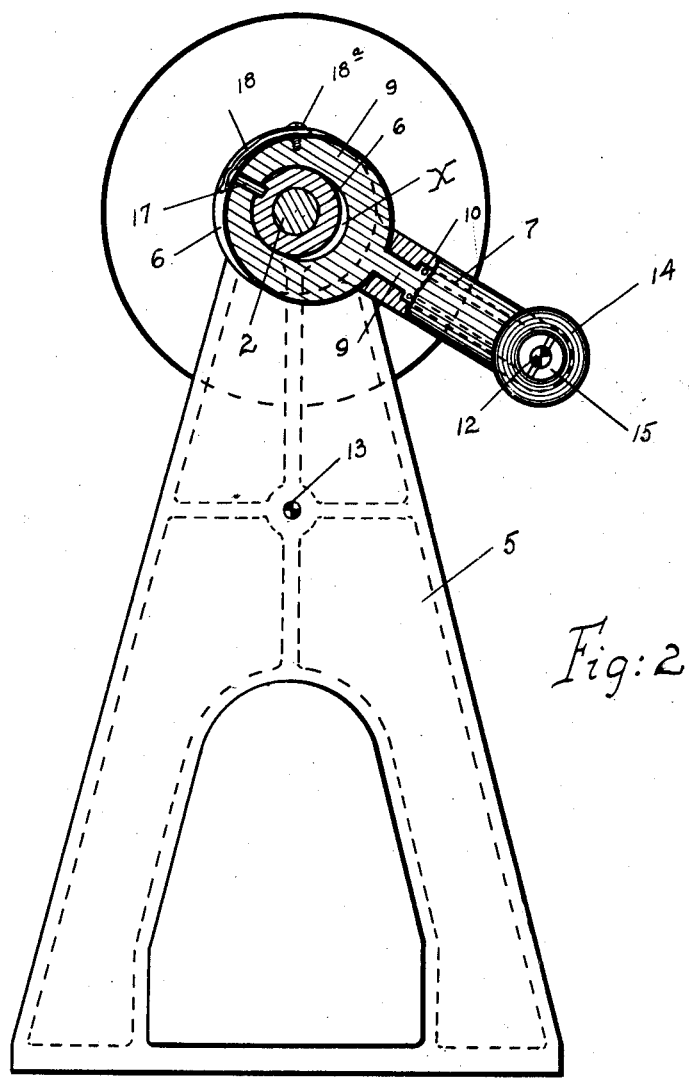
Fig:2

WILLIAM WENDERHOLD, OF NEW YORK, N. Y., ASSIGNOR TO CRU PATENTS CORPORATION, A CORPORATION OF NEW YORK.

REELING APPARATUS.

1,348,193.  Specification of Letters Patent.  Patented Aug. 3, 1920.

Application filed December 13, 1917. Serial No. 206,948.

*To all whom it may concern:*

Be it known that I, WILLIAM WENDERHOLD, a citizen of the United States, residing at New York city, in the county and State of New York, have invented certain new and useful Improvements in Reeling Apparatus, of which the following is a clear, full, and exact description.

The object of my invention is to provide a crank with which a reel shaft is rotated, said handle being adapted to be instantly disconnected and also to be utilized as a brake.

My invention relates more particularly to a reeling or winding apparatus such as employed in the motion picture industry.

Referring to the drawings,

Fig. 2 is another partial vertical cross-section of my device.

Figure 1:
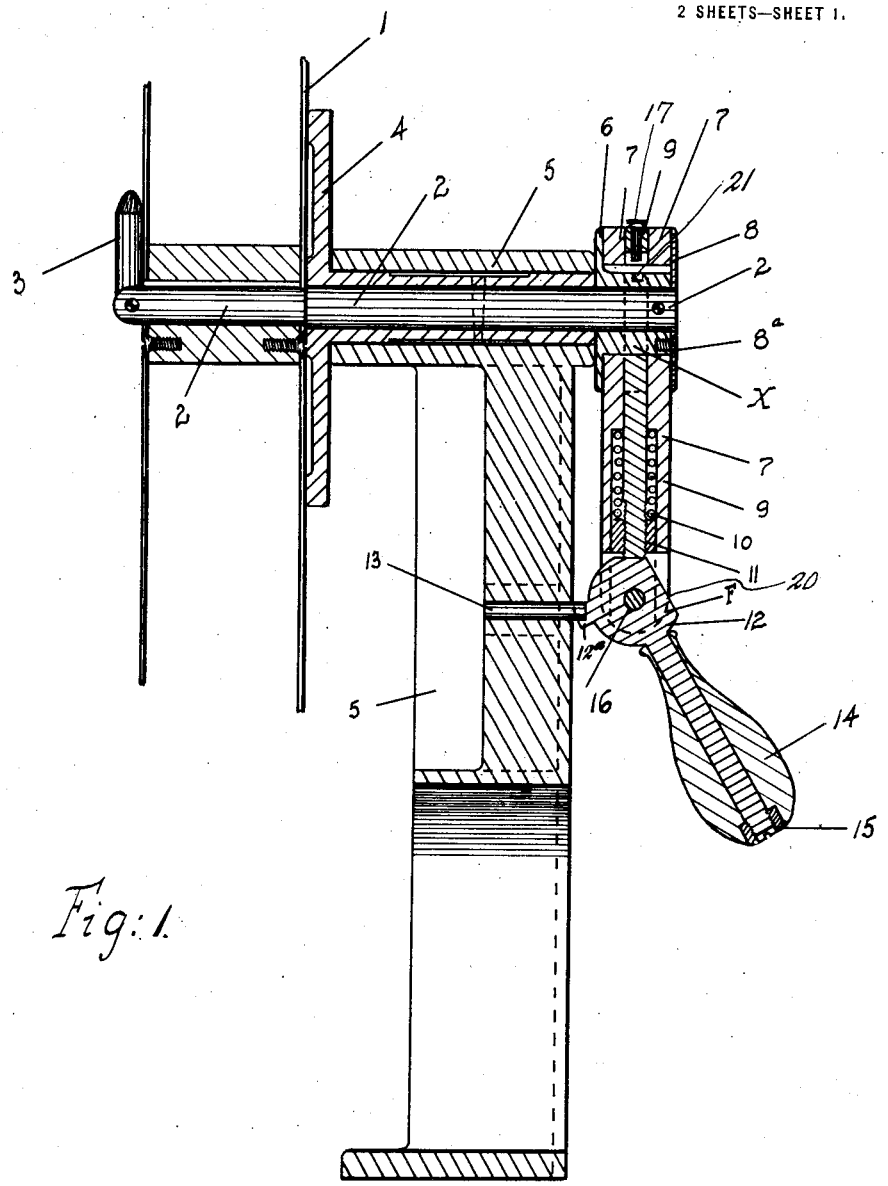
Figure 1 is a vertical cross-section through a winding apparatus embodying my invention.

As shown in Fig. 1, the film reel 1 is held on the reel shaft 2 by the pivotal member 3 against the guide disk 4. The special functions of this disk will be described in my co-pending application Serial No. 211,843, filed January 14, 1918. The disk 4 is pinned onto the shaft 2 and the entire is supported by the frame 5.

On the end of reel shaft 2 is fastened the collar 6 peripherally grooved, as shown, and upon which collar is loosely mounted the crank arm 7 and held there by the washer 8. This washer is fastened to collar 6 by screw 8ª.

The crank arm is provided with a longitudinally extending slot in which is slidably mounted a plunger 9. The end of the crank arm fits loosely over the shank of the collar 6 by means of an elongated hole therein as more clearly shown in Fig. 2. The slidable member 9 is threaded at its end to receive thereon a nut 11, which nut 11 completely fills a counter bore provided in the crank arm 7 but is slidable therein with the plunger 9. Interposed between the nut 11 and the end of the counter bore in the crank arm 7 is a spring 10, preferably a coil spring, and normally exerting a tension or downward pull on the sliding member 9 to keep the end thereof in constant contact with the crank handle as will be more fully described. The handle 14 is pivotally secured to the crank arm 7 on pin 16 and is provided with a projection 12ª which strikes an obstruction pin 13 carried by frame 5 when the handle is disposed at an acute angle relative to the crank arm. The peripheral edge of the pivotally mounted portion of the handle 14 is flattened to form a plurality of flat surfaces each located at a different distance from the axis 16 of pivotal movement. When the handle is in a position at right angles to the crank arm the end of the slidable member 9 rests on the surface 20 being drawn thereto by means of the spring 10. This draws the end of the crank arm downwardly so that the pin 17 thereof enters the groove 21 in the shank of the collar 6 thus making a positive connection between the crank arm and the shaft 2. When the handle, however, is turned to the position shown in Fig. 1 relative to the crank arm the slidable member 9 is forced upwardly exerting a friction at the point marked "X" on the shank of the collar 6 and at the same time lifting pin 17 out of the peripheral hole 21 provided therefor in the shank of the collar 6. A spring 18 is provided which is fastened to the member 9 by means of screws 18ª, which spring guards the pin from falling out and also yieldingly allows the pin 17 under the tension of the spring to ride against the shank of the block 6 until it comes to a position opposite the hole 21 in the shank.

Many other modifications will readily occur to those skilled in the art without departing from the spirit and scope of my invention as defined in the claims; therefore what I claim as new and useful and of my own invention and desire to secure by Letters Patent is:—

1. The combination with a part to be rotated, of a crank arm slidably mounted around the part to be driven and provided with a movable member therein, a pivotally mounted handle for said crank arm, means for maintaining said movable member in yielding contact with said handle, means for shifting said movable member upon pivotal movement of said handle to cause said member to brake the part to be rotated when said handle is in one position, and means for establishing a positive connection between said crank arm and said part to be rotated when said handle is in a second position.

2. The combination with a shaft to be driven, of a crank arm, a handle pivotally secured thereto, means whereby when said handle is disposed at right angles to said crank arm, a positive connection between said crank arm and shaft is secured, and when said handle is not at right angles to said crank arm, a brake is applied to the shaft to be driven, and said positive connection is broken.

3. The combination with a shaft to be driven, of a crank arm, a handle pivotally secured thereto, means whereby when said handle is disposed at right angles to said crank arm, a positive connection between said crank arm and shaft is secured, and when said handle is not at right angles to said crank arm, said positive connection is broken and a frictional brake is applied to the shaft to be driven.

Signed at the city of New York, New York, this 24th day of November, one thousand nine hundred and seventeen.

WILLIAM WENDERHOLD.